United States Patent
Gimmler et al.

(10) Patent No.: US 6,459,981 B1
(45) Date of Patent: Oct. 1, 2002

(54) PROCESS AND SYSTEM FOR THE AUTOMATED INFLUENCING OF THE VEHICLE HANDLING OF A MOTOR VEHICLE HAVING AN INTERNAL COMBUSTION ENGINE

(75) Inventors: Helmut Gimmler; Kai Holdgrewe, both of Schwaikeim; Klaus-Peter Kuhn, Pluederhausen; Christian Onnen, Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/518,171

(22) Filed: Mar. 2, 2000

(30) Foreign Application Priority Data

Mar. 2, 1999 (DE) .......................... 199 08 907

(51) Int. Cl.$^7$ ............................. G06F 7/00; G06F 17/00
(52) U.S. Cl. ............................ 701/93; 701/1; 123/349; 123/320
(58) Field of Search ................................ 701/93, 98–1, 701/57, 96; 123/350, 349, 320

(56) References Cited

U.S. PATENT DOCUMENTS

| | | | | |
|---|---|---|---|---|
| 4,853,720 A | * | 8/1989 | Onari et al. | 364/431.07 |
| 4,967,357 A | | 10/1990 | Mimura | |
| 5,021,958 A | * | 6/1991 | Tokoro | 364/426.04 |
| 5,099,429 A | | 3/1992 | Onari | |
| 5,508,925 A | | 4/1996 | Katayama | |
| 5,845,726 A | * | 12/1998 | Kikkawa et al. | 180/178 |
| 5,875,679 A | * | 3/1999 | Salecker et al. | 74/335 |
| 6,067,496 A | * | 5/2000 | Bonoliel et al. | 701/93 |

FOREIGN PATENT DOCUMENTS

| | | |
|---|---|---|
| DE | 35 23 352 C2 | 6/1985 |
| DE | 37 15 423 C2 | 5/1987 |
| DE | 3709388 | 4/1991 |
| DE | 4111023 | 10/1994 |

* cited by examiner

Primary Examiner—William A. Cuchlinski, Jr.
Assistant Examiner—Olga Hernandez
(74) Attorney, Agent, or Firm—Crowell & Moring LLP

(57) ABSTRACT

In a process for automatic adjustment of handling of a motor vehicle having an internal-combustion engine, operating and condition quantities are determined and compared with reference values. If the operating and condition quantities deviate from the reference values, adjusting signals are generated for adjusting vehicle and engine components. In order to recognize predetermined driving situations, and to make corresponding adjustments for influencing the vehicle handling, starting and ending of predetermined driving modes (acceleration operation, deceleration operation and constant drive operation) are detected by logically evaluating diverse operating and condition quantities. The conditions for detecting the start of a driving condition differ from the conditions for the end of the same driving condition. When one of the conditions for the start or the end of an acceleration operation, of a deceleration operation or of a constant driving operation exists, adjusting signals are generated for automatically adjusting of vehicle and engine components.

20 Claims, 2 Drawing Sheets

PROCESS AND SYSTEM FOR THE AUTOMATED INFLUENCING OF THE VEHICLE HANDLING OF A MOTOR VEHICLE HAVING AN INTERNAL COMBUSTION ENGINE

BACKGROUND AND SUMMARY OF THE INVENTION

This application claims the priority of German patent document 199 08 907.8, filed Mar. 2, 1999, the disclosure of which is expressly incorporated by reference herein.

The invention relates to a process and apparatus for automatic adjustment of the handling of a motor vehicle having an internal-combustion engine.

German Patent Document DE 35 23 352 C2 discloses a process for automatically controlling the driving speed of a motor vehicle, in which the actual vehicle speed is sensed and, in the event of a deviation from a desired value, both automatic acceleration control and automatic speed control are started, taking into account the relationship for the throttle valve angle as a function of the desired speed and the actual speed. In its basic structure, this process corresponds to a conventional automatic speed control, in which an automatic control unit generates adjusting signals from measuring signals according to a defined calculating rule, for adjusting diverse vehicle components.

The journal article from *Elektronik* 18/1995, Pages 44 to 46, Vol. 48, with the title "Smoothly Accelerated" by Wolfgang Rode and Raimund Schuetz describes a method for controlling an electric drive motor of a motor scooter, using a fuzzy logic. To avoid dangerous driving situations, a number of conditions are formulated; that is, operating and condition quantities reflected in logic variables are linked with one another and are examined with respect to their truth content according to a fixed testing logic. The vehicle speed, the position of the throttle twist grip, the battery voltage and the current intensity are determined as the operating and condition quantities, and are divided into defined categories corresponding to their value.

By means of logical conditions to be tested cyclically, a number of dangerous situations, such as the rearing-up of the vehicle as the result of a very high starting torque, are prevented.

However, this method is limited to the use of electric motors. It cannot be used to control (automatically or otherwise) components in vehicles having an internal-combustion engine.

One object of the invention is to provide a method and apparatus for detecting driving situations in motor vehicles having an internal-combustion engine, and for controlling vehicle handling as a function of the determined driving situation.

This and other objects and advantages are achieved by the method and apparatus according to the invention for automatically adjusting the handling of a motor vehicle operated by an internal-combustion engine, in which a set or rules is used to detect the start and the ending of three different driving conditions: constant drive, acceleration and deceleration. For this purpose, certain vehicle operating parameter values and vehicle operating mode (condition) values are detected or determined, advantageously in successive, hierarchically arranged steps, and are linked in an automatic control unit by means of the defined set of rules. Upon occurrence of the start or the end of one of such driving conditions the automatic control unit generates adjusting signals, which are supplied to, and used for automatic adjustment of, the corresponding vehicle or motor components.

In this manner, it is possible to take corresponding measures at the start and end of a driving situation, to achieve improved economy and/or a safety relevant driving strategy. For example, after the start of a deceleration is triggered by the actuation of the foot brake, it is possible to prepare, initiate or carry out additional braking measures (such as activating the engine brake) to assist the braking operation.

The conditions recorded in the set of rules for determining the start and end of constant driving, acceleration and deceleration are formulated in different manners. This can be accomplished by defining different rules for the start and for the end of one driving condition respectively; in particular, this can be done by defining different reference values for one and the same operating or condition value which is used as the basis for assessing the start and end of an actual driving condition. In this manner, a type of hysteresis function can be implemented to determine the start and end of a driving condition. This arrangement positively influences the decision for the start and end to such an extent that inaccuracies or rapid shifting back and forth between two shifting conditions can be avoided. Expediently, higher reference values are defined for the start of a vehicle condition than for its end, so that undesirably fast shifting between two driving conditions is avoided. As the result a smoothing of the functions is achieved for acceleration, constant driving and deceleration.

As the operating and conditions values, first one or several of the values, "clutch closed" (clutch status), "vehicle stops" (vehicle driving status), "vehicle brake is used" (brake status) and "retarder is used" (retarder status), are determined (either directly by measuring or indirectly by processing measured values). These values are determined, expediently in a preceding step (data preprocessing), before the linking of the operating and condition quantities is carried out according to defined rules.

One or more of the values, vehicle acceleration, vehicle speed, accelerator pedal position, accelerator pedal velocity, road inclination, change of the road inclination and torque difference, as well as the change of the difference between the torque desired by the driver and the actual drive torque, are determined as additional values for assessing the vehicle condition.

The measured or calculated operating and condition quantities are processed individually or combined in a set of rules stored in the control unit, and are used to determine whether the vehicle is currently at the start or end of an acceleration operation, a deceleration operation or a constant drive.

Both logical values (states) and numerical values can be used as operating and condition quantities. The values determined in data preprocessing advantageously are logical values (states); the remaining operating and condition quantities are numerical values. A combined query of the logical and the numerical values takes place in the set of rules.

Other objects, advantages and novel features of the present invention will become apparent from the following detailed description of the invention when considered in conjunction with the accompanying drawings.

DETAILED DESCRIPTION OF THE DRAWINGS

Figure 1:
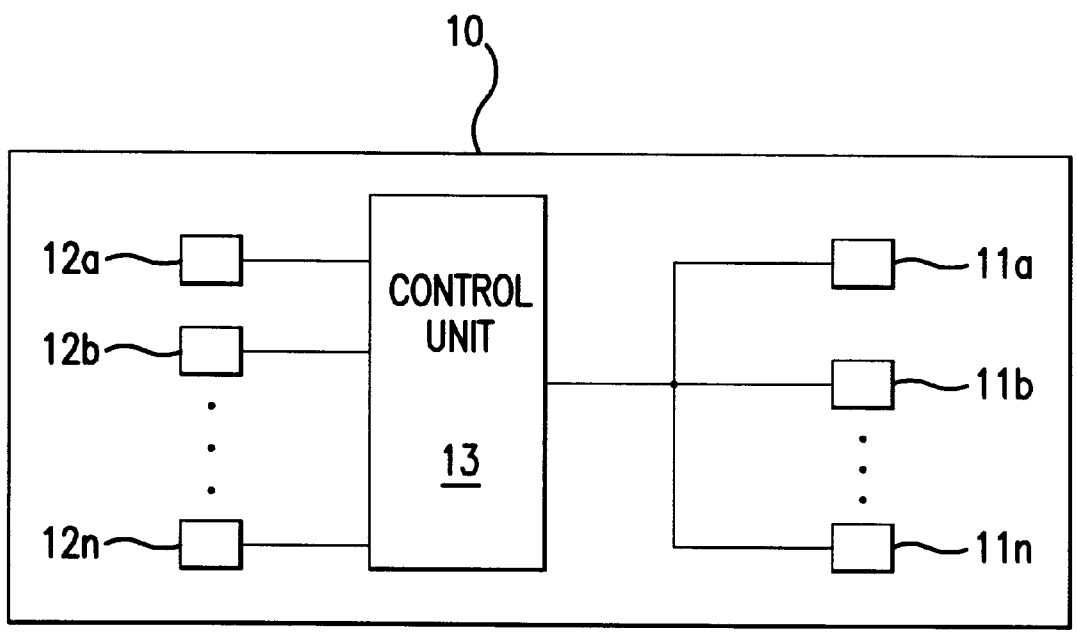
FIG. 1 is a schematic block diagram of a control system according to the invention.

FIG. 1 is a schematic block diagram of a control system for implementing the control process according to the invention. As shown in FIG. 1, vehicle 10 has a plurality of controlled vehicle and engine components, which are depicted schematically as blocks 11a–11n. A plurality of sensors 12a–12n generate signals indicative of operating and condition values which characterize various components of the vehicle, such as the clutch, the accelerator and the like. Information from these sensors is provided to the control unit 13 which processes and logically links the input values in order to generate adjustment signals to control the various vehicle components 11a–11n.

Figure 2:
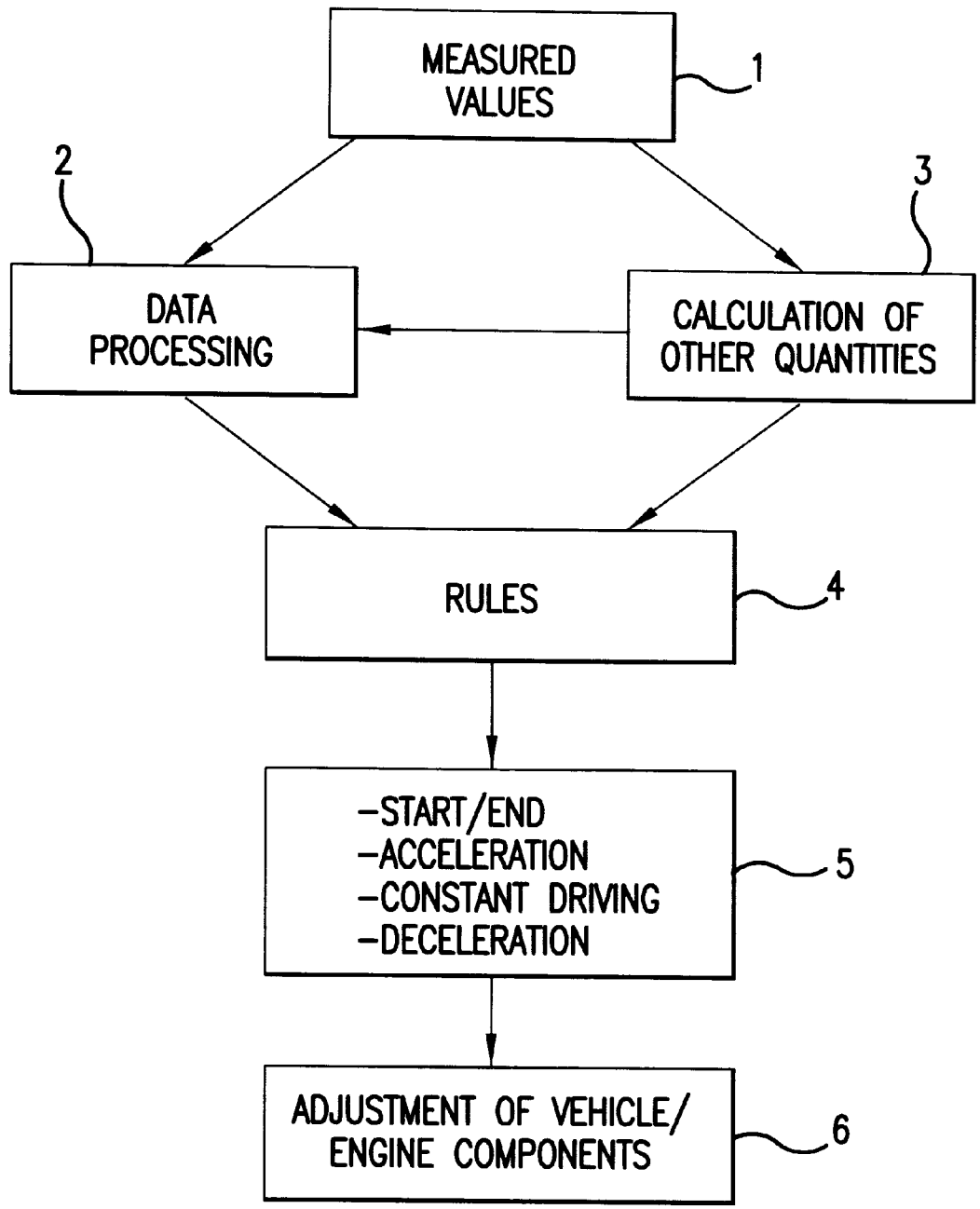
FIG. 2 schematically illustrates the sequence of an automated process for detecting the driving situation and for adjusting vehicle handling of a motor vehicle with an internal-combustion engine.

Referring now to FIG. 2, according to the first process step illustrated in block 1, measured values necessary for automatic control of components are first received in the vehicle by sensors. In particular, the vehicle speed; the accelerator pedal position; the torque desired by the driver; in the case of a manual transmission, the clutch status and the actual gear; in the case of a retarder, the position of the retarder lever; and the position of the brake light switch are determined. Optionally time dependence may be taken into account, and only one or several of the above-mentioned values may be determined in any combination.

In a subsequent process step, data preprocessing illustrated in block 2, some or all of the measured values determined in block 1, and other values determined in block 3, are used to determine the operating and condition quantities:

clutch closed;
  vehicle stops;
  vehicle starts to drive;
  vehicle brake is used; and
  retarder is used.

These values generated in the data preprocessing block 2 are generated as logical variables in an automatic control unit of the motor vehicle, and assume either of the values "TRUE" and or "FALSE". They are calculated in part by using operating and condition values derived from the measured values which are determined in the parallel process step in block 3, specifically as follows:

The operating and condition quantity "clutch closed" is set to "TRUE" if the clutch status is smaller than a given reference value.

The operating and condition quantity "vehicle stops" is set to "TRUE" if the accelerator pedal velocity, which is determined in block 3, is negative and the vehicle speed is below a given reference value.

The operating and condition quantity "vehicle starts to drive" is set to "TRUE" if the accelerator pedal velocity is positive and the vehicle speed is lower than a given reference value.

The operating and condition quantity "retarder used" is set to "TRUE" if the retarder lever is at a value larger than zero.

The operating and condition quantity "brakes used" is set to "TRUE" if the brake light switch is switched on or the retarder lever is at a value larger than zero.

In the parallel block 3, the operating and condition quantities which cannot be (or are not) measured directly are calculated from the measured values determined in process step 1. Data from block 3 are partly transferred into block 2; optionally, the calculation of the values from block 3 takes place before the calculation of the values from block 2.

In block 3, particularly the quantities vehicle acceleration, accelerator pedal velocity, road inclination, change of road inclination, torque difference and torque difference change (that is, the change in the difference between the torque desired by the driver and the actual drive torque) are calculated. The operating and condition quantities to be determined, as well as the measured values from block 1 are numerical variables which are expediently divided into defined intervals corresponding to their measured or calculated value.

Specifically:

vehicle acceleration is divided into at least one of the intervals zero, not zero, positive, not positive, negative, not negative;

vehicle speed is divided into at least one of the intervals very high, not very high, not low, not very low;

accelerator pedal position is divided into one of the intervals zero, small, large;

an automatic transmission is used, the accelerator pedal position is divided into one of the intervals kickdown, no kickdown;

accelerator pedal velocity is divided into one of the intervals zero, negative, positive;

road inclination is divided at least into one of the intervals not very positive, not very large positive;

change of the road inclination is divided into at least one of the intervals zero, not zero, negative, not negative, positive, not positive, very large;

torque difference between the torque desired by the driver and the actual drive torque is optionally divided into the interval not small;

torque difference change is divided into at least one of the intervals large, very large.

The interval limits for each operating and condition quantity can be defined as a fixed invariable quantity, or can be adapted as a function of other varying quantities, depending on the situation.

In the next process step (block 4) using a set of rules to process the logical and the numerical variables, the actual driving condition of the vehicle is determined, which analyzed in block 5 and assigned to one of the six categories, being the start or end of an acceleration operation, a constant drive or a deceleration operation. Thereafter, as a function of the actual vehicle condition determined in block 4 and 5, adjusting signals are generated (block 6) for adjusting diverse vehicle and/or engine components to achieve optimized vehicle handling with regard to efficiency and/or driving safety. For example, measures are taken at the start of an operation which assist the actual operation and measures are taken at the end of an operation which conclude the actual operation. These measures concern particularly also engine components which influence the behavior of the internal-combustion engine.

In order to avoid rapid back-and-forth shifting between two different vehicle conditions which might otherwise result from slight measured-value fluctuations or inaccuracies during the calculation and which may trigger a constant undesirable change in the adjustment of the vehicle and engine components, different conditions are formulated for the start and for the end of a particular vehicle condition. The different conditions can be expressed in the form of different rules for the start and for the end of the same driving condition respectively. Furthermore, it is also possible and expedient to define for the start and for the end, different reference values for the query of individual operating and condition quantities. In the latter case (particularly for the decision whether the start of a driving condition exists), higher reference values are defined for an operating and condition quantity than for the decision as to whether a driving condition is ended.

For the decision whether the start of an acceleration is currently taking place, one or several of the operating and condition quantities, vehicle speed, vehicle acceleration, accelerator pedal position, accelerator pedal velocity, road inclination, and "vehicle starts to drive", are taken into account in the set of rules of block 4. The start of an acceleration operation exists, for example, if at least one of the following conditions has been met:

Vehicle starts to drive–"TRUE";

vehicle acceleration=positive AND vehicle speed=not very high AND accelerator pedal position=large, AND (OPTIONALLY) accelerator pedal velocity=positive, AND/OR road inclination=not very positive.

accelerator pedal position=large AND accelerator pedal velocity=positive AND change of the road inclination= positive.

For the decision as to whether the start of a constant drive exists, one or several of the operating and condition quantities, vehicle speed, vehicle acceleration, accelerator pedal position, accelerator pedal velocity, and "clutch closed", are taken into account. The start of a constant drive exists if at least one of the following conditions has been met:

Clutch closed="TRUE" AND vehicle speed=very high, AND (OPTIONALLY) accelerator pedal=not negative;

clutch closed="TRUE", AND vehicle acceleration=zero, AND accelerator pedal velocity=zero, AND (OPTIONALLY) accelerator position=no kickdown.

To determine whether the end of an acceleration operation exists, one or several of the operating and condition quantities, accelerator pedal position, accelerator pedal velocity, "clutch closed", "vehicle stops", "brake is used", "retarder is used" and "start of constant drive", are taken into account. The end of the acceleration operation exists if at least one of the following conditions has been met:

Vehicle stops "TRUE"

clutch closed="TRUE" AND accelerator pedal position= zero;

clutch closed="TRUE" AND vehicle acceleration=not positive AND accelerator pedal position=small AND accelerator pedal velocity=negative;

clutch closed="TRUE" AND accelerator pedal position= not positive;

clutch closed="TRUE" AND accelerator pedal velocity= negative;

clutch closed="TRUE" AND vehicle brake is used= "TRUE";

clutch closed="TRUE" AND retarder is used="TRUE"; start of constant drive="TRUE".

To detect the start of a deceleration operation, one or more of the operating and condition quantities, vehicle speed, vehicle acceleration, road inclination, accelerator pedal position, "clutch closed" and "brakes are used", are taken into account. The start of a deceleration operation exists if at least one of the following conditions has been met:

Vehicle speed=not very low AND vehicle speed= negative, AND at least one of the following: clutch closed="TRUE" or road inclination=not very positive, AND at least one of the following: brakes are used= "TRUE" or accelerator pedal position=zero.

To detect the end of a constant drive, one or more of the operating and condition quantities, vehicle acceleration, "clutch closed", "vehicle stops", "start of acceleration" and "start of deceleration", are taken into account. The end of a constant drive exists if at least one of the following conditions has been met:

Vehicle acceleration=not zero, AND clutch closed= "TRUE";

accelerator pedal velocity=not zero, AND clutch closed= "TRUE", AND (OPTIONALLY) change of inclination=zero;

change of inclination=very large, AND clutch closed= "TRUE";

accelerator pedal position=kickdown, AND clutch closed="TRUE", AND (OPTIONALLY) torque difference=not small;

change of torque difference=very large, AND clutch closed="TRUE";

vehicle stops="TRUE";

acceleration starts="TRUE";

deceleration starts="TRUE".

To determine whether the end of a deceleration operation occurs, one or more of the operating and condition quantities, vehicle acceleration, "clutch closed", "vehicle stops", "vehicle brake is used", "retarder is used" "start of acceleration" and "start of constant drive", are taken into account. The end of a deceleration operation is detected if at least one of the following conditions has been met:

Vehicle acceleration=not negative, AND (OPTIONALLY) clutch closed="TRUE";

vehicle stops="TRUE";

acceleration starts="TRUE";

constant drive starts="TRUE";

vehicle brake is used="FALSE", AND (OPTIONALLY) retarder is used="FALSE".

The process steps illustrated in blocks 2 to 6 are carried out in an automatic control unit of the motor vehicle, which communicates with adjusting elements of diverse engine and vehicle components.

The term "clutch" used above can be applied to mechanical friction clutches as well as to lock-up clutches in torque converters which are used in automatic transmission.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for automatic adjustment of the handling of a motor vehicle having an internal-combustion engine, comprising:

determining operating and condition quantities;

comparing said operating and condition quantities with reference values; and if the operating and condition quantities deviate from the reference values, generating adjusting signals for adjusting vehicle and engine components; wherein a plurality of the quantities, clutch closed; vehicle stops; vehicle starts to drive; vehicle brake is being used; retarder is being used; vehicle acceleration; vehicle speed; accelerator pedal position; accelerator pedal velocity; road inclination; change of road inclination; difference between torque desired by driver and actual drive torque; and change in the difference between torque desired by driver and actual drive torque, are determined as the operating and condition quantities;

by logical evaluation of the operating and condition quantities, starting and ending of particular vehicle operating modes, including vehicle acceleration operation, vehicle deceleration operation and constant drive operation, are detected, with conditions for detecting the starting of a particular vehicle operating mode being different from the conditions for the ending of the same vehicle operating mode; and when a starting or an ending of an acceleration operation, of a deceleration operation or of a constant drive operation is detected, adjusting signals are generated for automatic adjustment of vehicle and engine components.

2. Process according to claim 1, wherein higher reference values are used to detect the starting of a vehicle condition, than for the ending of the same vehicle condition.

3. Process according to claim 1 wherein at least one of the quantities clutch closed, vehicle stops, vehicle starts to drive, vehicle brake is used and retarder is used is determined in a data preprocessing step which precedes linking of the operating and condition quantities.

4. Process according to claim 1 wherein the respective operating and condition quantities are processed to assign a value thereto, and are classified with respect to predetermined intervals according to said assigned value.

5. Process according to claim 1, wherein the operating and condition quantities are logical values.

6. Process according to claim 5, wherein the quantities, clutch closed, vehicle stops, vehicle starts to drive, vehicle brake used and retarder used, are characterized by logical values.

7. Process according to claim 1, wherein the operating and condition quantities are characterized by numerical values.

8. Process according to claim 7, wherein the quantities, vehicle acceleration, vehicle speed, accelerator pedal position, accelerator pedal velocity, road inclination, change of road inclination, torque difference and change of torque difference, are characterized by numerical values.

9. Process according to claim 1, wherein a start of an acceleration operation is detected based on at least one of the operating and condition quantities: vehicle speed, vehicle acceleration, accelerator pedal position, accelerator pedal velocity, road inclination and "vehicle starts to drive".

10. Process according to claim 1, wherein a start of a constant drive operation is detected based on at least, one of the operating and condition quantities, vehicle speed, vehicle acceleration, accelerator pedal, accelerator pedal velocity and "clutch closed".

11. Process according to claim 1, wherein an ending of an acceleration operation is detected, based on at least one of the operating and condition quantities: accelerator pedal position, accelerator pedal velocity, "clutch closed", "vehicle stops", "brake is used", "retarder is used" and "start of constant drive".

12. Process according to claim 1, wherein a start of a deceleration operation is detected based on at least one of the operating and conditions quantities: vehicle speed, vehicle acceleration, road inclination, accelerator pedal position, "clutch closed" and "brakes are utilized".

13. Process according to claim 1, wherein an ending of constant drive operation is detected based on at least one of the operating and condition quantities: vehicle acceleration, "clutch closed", "vehicle stops", "start of acceleration" and "start of deceleration".

14. Process according to claim 1, wherein an ending of the deceleration is detected based on at least one of the operating and condition quantities: vehicle acceleration, "clutch closed", "vehicle stops", "vehicle brake is used", "retarder is used", "start of acceleration" and "start of constant drive".

15. Apparatus for automatic adjustment of the handling of a motor vehicle having an internal-combustion engine, comprising:

an automatic control unit having inputs for receiving signals which represent vehicle operating and condition quantities, and means for generating adjustment signals for adjusting vehicle and engine components, in the event of a deviation of the operating and condition quantities from given reference values; wherein a plurality of the quantities, clutch closed, vehicle stops, vehicle starts to drive, vehicle brake used, vehicle acceleration, vehicle speed, accelerator pedal position, accelerator pedal velocity, road inclination, are available to the automatic control unit as input signals representing operating and condition quantities; and the automatic control unit is programmed to determine operating and condition quantities, compare said operating and condition quantities with reference values, and if the operating and condition quantities deviate from the reference values, generate adjusting signals for adjusting vehicle and engine components; wherein a plurality of the quantities, clutch closed; vehicle stops; vehicle starts to drive; vehicle brake is being used; retarder is being used; vehicle acceleration; vehicle speed; accelerator pedal position; accelerator pedal velocity; road inclination; change of road inclination; difference between torque desired by driver and actual drive torque; and change in the difference between torque desired by driver and actual drive torque, are determined as the operating and condition quantities;

by logical evaluation of the operating and condition quantities, starting and ending of particular vehicle_operating modes, including vehicle acceleration operation, vehicle deceleration operation and constant drive operation, are detected, with conditions for detecting the starting of a particular vehicle operating mode being different from the conditions for the ending of the same vehicle operating mode; and when a starting or an ending of an acceleration operation, of a deceleration operation or of a constant drive operation is detected, adjusting signals are generated for automatic adjustment of vehicle and engine components.

16. A process for adjusting handling of a motor vehicle having an internal combustion engine, comprising:

determining operating and condition values selected from the group consisting of clutch closed, vehicle stops, vehicle starts to drive, vehicle brake is being used, retarder is being used, vehicle acceleration, vehicle speed, accelerator pedal position, accelerator pedal velocity, road inclination, change of road inclination, torque difference torque desired by driver - actual drive torque, and change in the difference between torque desired by driver and actual drive torque;

detecting a starting or an ending of an acceleration operation, of a deceleration operation or of a constant drive operation based on an evaluation of determined operating and condition values, with conditions for detecting a starting of a vehicle operating mode differing from conditions for detecting an ending of the same operating mode; and adjusting operation of vehicle and engine components as a function of a detection of a starting or an ending of a vehicle operating mode;

wherein said evaluation of determined operating and condition values includes comparison of a plurality of said values with a predetermined reference value, and a logical linking of determined operating and condition values.

17. Process according to claim 16, wherein higher reference values are used to detect the starting of a vehicle condition, than for the ending of the same vehicle condition.

18. Process according to claim 16, wherein the quantities, clutch closed, vehicle stops, vehicle starts to drive, vehicle brake used and retarder used, are characterized by logical values.

19. Process according to claim 16, wherein the operating and condition quantities are characterized by numerical values.

20. Process according to claim 16, wherein the quantities, vehicle acceleration, vehicle speed, accelerator pedal position, accelerator pedal velocity, road inclination, change of road inclination, torque difference and change of torque difference, are characterized by numerical values.

* * * * *